(12) United States Patent
Zhang et al.

(10) Patent No.: US 6,269,687 B1
(45) Date of Patent: Aug. 7, 2001

(54) FORCE SENSING SLIDER

(75) Inventors: Jing Zhang, Woodbury, MN (US); Lei Zhang, San Jose, CA (US); Peter R. Segar, Burnsville; Mark J. Schaenzer, Eagan, both of MN (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/072,815

(22) Filed: May 5, 1998

Related U.S. Application Data

(60) Provisional application No. 60/059,442, filed on Sep. 22, 1997.

(51) Int. Cl.[7] ................................................. G01B 5/28
(52) U.S. Cl. ............................................................. 73/105
(58) Field of Search ............................. 73/105, 862.043, 73/660

(56) References Cited

U.S. PATENT DOCUMENTS

| | | | |
|---|---|---|---|
| 4,605,977 | 8/1986 | Matthews | 360/103 |
| 4,620,251 | 10/1986 | Gitzendanner | 360/103 |
| 4,651,242 | 3/1987 | Hirano et al. | 360/103 |
| 4,853,810 | 8/1989 | Pohl et al. | 360/103 |
| 4,962,391 | 10/1990 | Kitahara et al. | 346/140 |
| 5,021,906 | 6/1991 | Chang et al. | 360/103 |
| 5,034,828 | 7/1991 | Ananth et al. | 360/75 |
| 5,065,268 | 11/1991 | Hagen | 360/104 |
| 5,072,240 | 12/1991 | Miyazawa et al. | 346/140 |
| 5,079,659 | 1/1992 | Hagen | 360/104 |
| 5,105,408 | 4/1992 | Lee et al. | 369/44.15 |
| 5,189,578 | 2/1993 | Mori et al. | 360/106 |
| 5,255,016 | 10/1993 | Usui et al. | 346/140 |
| 5,276,573 | 1/1994 | Harada et al. | 360/103 |
| 5,552,809 | 9/1996 | Hosono et al. | 347/10 |
| 5,657,188 | 8/1997 | Jurgenson et al. | 360/106 |
| 5,915,271 | * 6/1999 | Berg et al. | 73/105 |
| 6,016,692 | * 1/2000 | Schaenzer et al. | 73/105 |
| 6,053,057 | * 4/2000 | Okada | 73/862.043 |

OTHER PUBLICATIONS

"Silicon Micromachined Electromagnet Microactuators for Rigid Disk Drives" by Tang et al, *IEEE Transactions on Magnetics*, vol. 31, No. 6, Nov. 1995.

"Magnetic Recording Head Positioning at Very High Track Densities Using a Microactuator–Based, Two–Stage Servo System" by Fan et al., *IEEE Transactions on Industrial Electronics*, vol. 42, No. 3, Jun. 1995.

(List continued on next page.)

*Primary Examiner*—Benjamin R. Fuller
*Assistant Examiner*—Jewel V. Thompson
(74) *Attorney, Agent, or Firm*—Kinney & Lange

(57) ABSTRACT

A disc drive test slider apparatus for measuring contact force with a surface of a rotating disc media includes a slider body positioned proximate the surface of the rotating disc. The slider body includes an air-bearing surface substantially parallel to the surface of the disc and separated from the surface of the disc by a glide height. A cavity is formed in the slider body having a side wall substantially normal to the surface of the disc and a wall substantially parallel to the surface of the disc. A beam flexure is attached to the side wall of the cavity. A plate is attached to the beam flexure in the cavity, the beam flexure having a spring resiliency to permit movement of the plate in the cavity substantially normal to the surface of the disc. A contact rod is attached to the plate, and extends through the cavity and a via in the slider body. The contact rod has a distal tip projecting from the air-bearing surface. A force applied to the contact rod perpendicular to the surface of the rotating disc media causes displacement of the plate normal to the surface of the disc. Metal films may be formed on the plate and on the wall substantially parallel to the surface of the disc, so that a change in capacitance between the metal films due to changes in a gap distance between the metal films caused by displacement of the plate normal to the surface of the disc may be determined. A relatively simple series of formation, deposition and etching steps may be performed to form the disc drive test slider apparatus.

18 Claims, 8 Drawing Sheets

OTHER PUBLICATIONS

"A Flexural Piggyback Milli–Actuator for Over 5 Gbit/in$^2$ Density Magnetic Recording" by Koganezawa et al, *IEEE Transactions on Magnetics,* vol. 32, No. 5, Sep. 1996.

"Transverse Mode Electrostatic Microactuator for MEMS-Based HDD Slider" by Imamura et al, *IEEE* 1996.

"An Experiment for Head Positioning System Using Sub-micron Track–width GMR Head" by Yoshikawa et al., *IEEE Transactions on Magnetics,* vol. 32, No. 5, Sep. 1996.

"Micro Electrostatic Actuators in Dual–Stage Disk Drives with High Track Density" by Tang et al., *IEEE Transactions on Magnetics,* vol. 32, No. 5, Sep. 1996.

"Piezoelectric Microactuator Compensating for Off–Track Errors in Magnetic Disk Drives" by Imamura et al, *Advance Information Storage Systems,* vol. 5, pp. 119–125.

"A Dual–Stage Magnetic Disk Drive Actuator Using a Piezoelectric Device for a High Track Density" by Mori et al., *IEEE Transactions on Magnetics,* vol. 27, No. 6, Nov. 1991.

"Dynamic Loading Criteria for 3½ Inch Inline HDD Using Multilayer Piezoelectric Load/Unload Mechanism" by Kajitani et al., *IEEE Transactions on Magnetics,* vol. 27, No. 6, Nov. 1991.

* cited by examiner

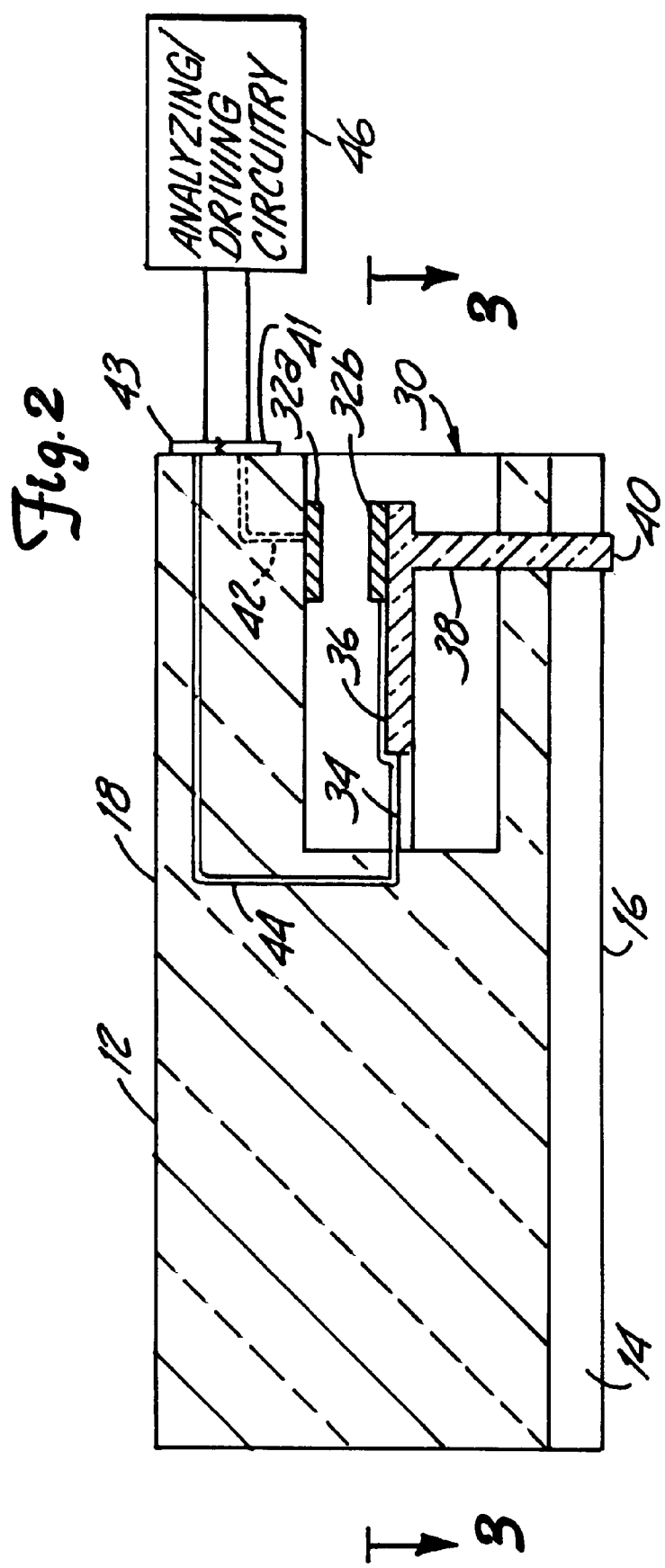

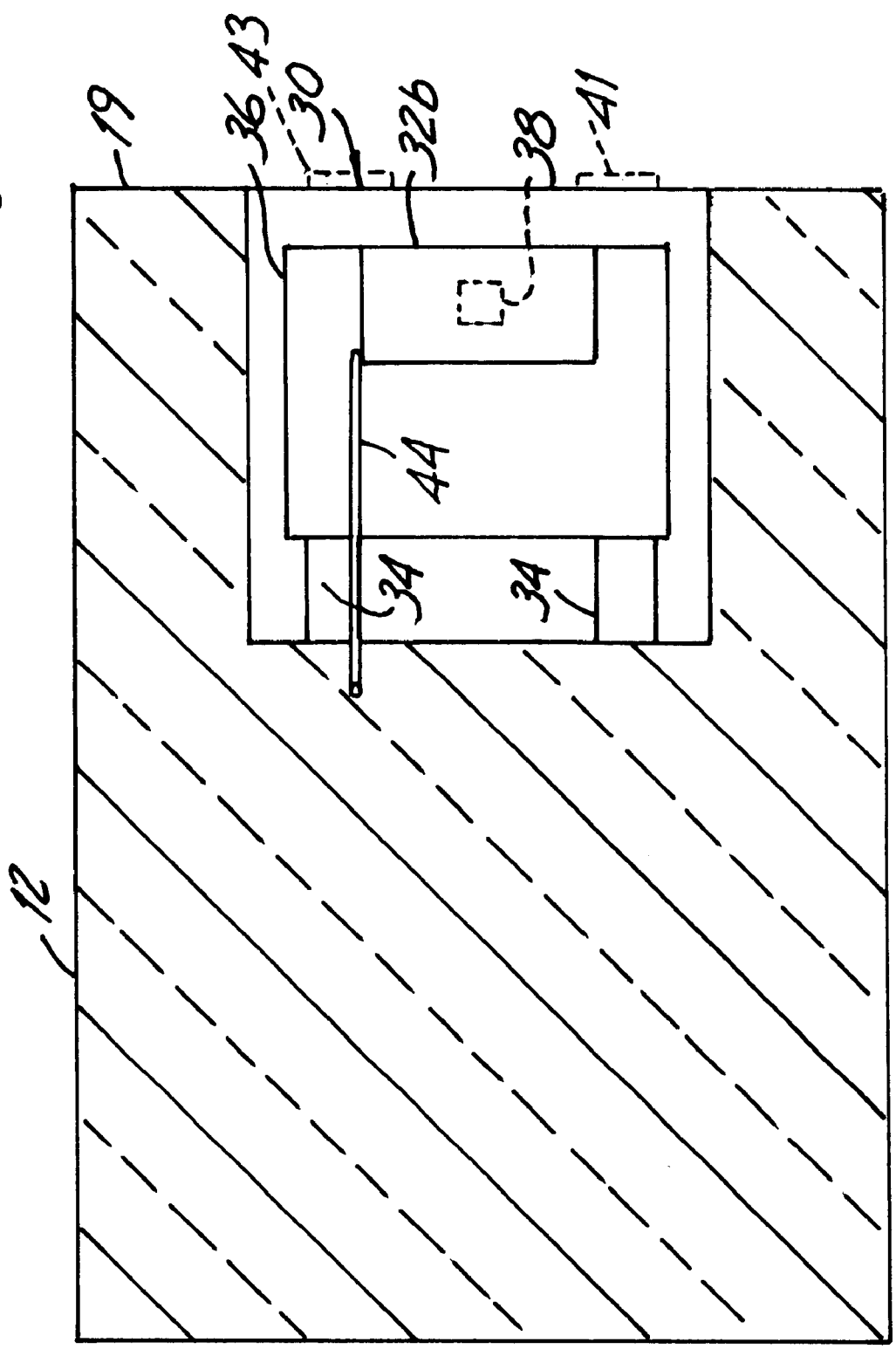

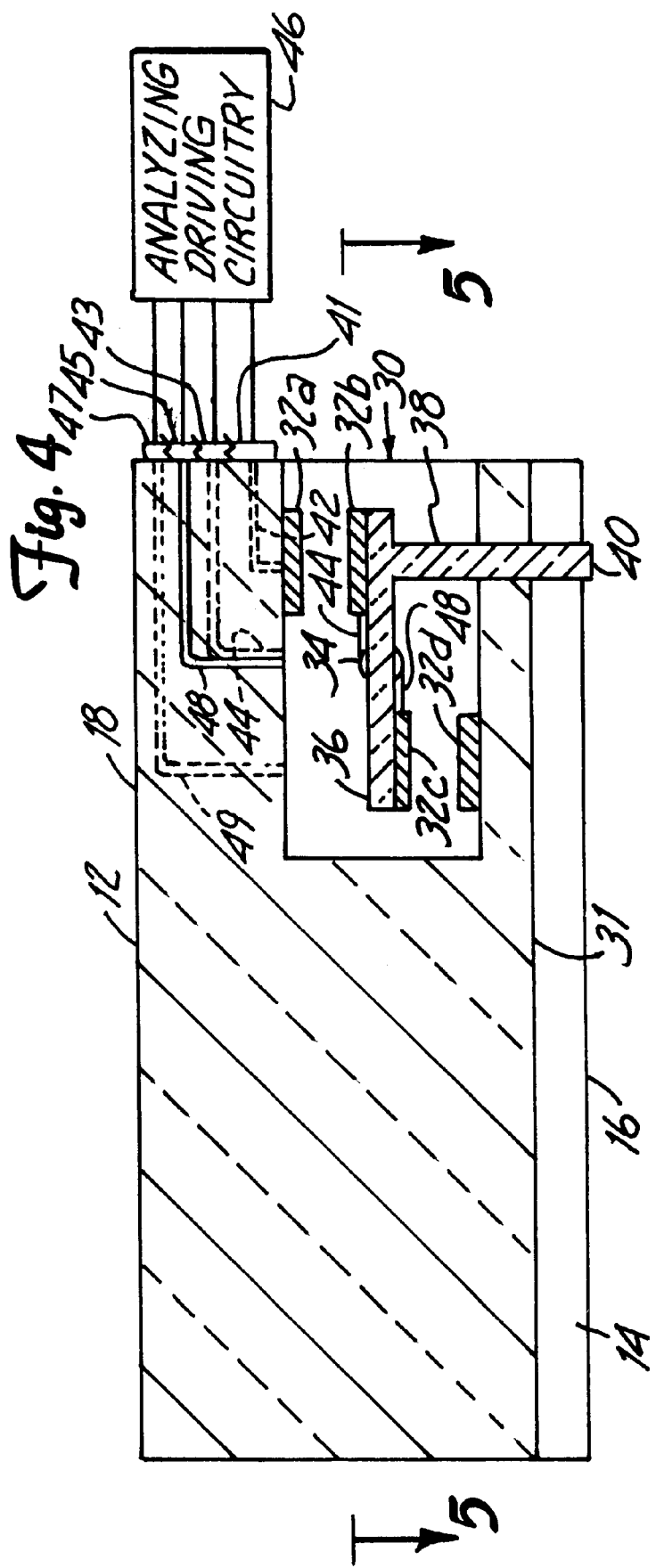

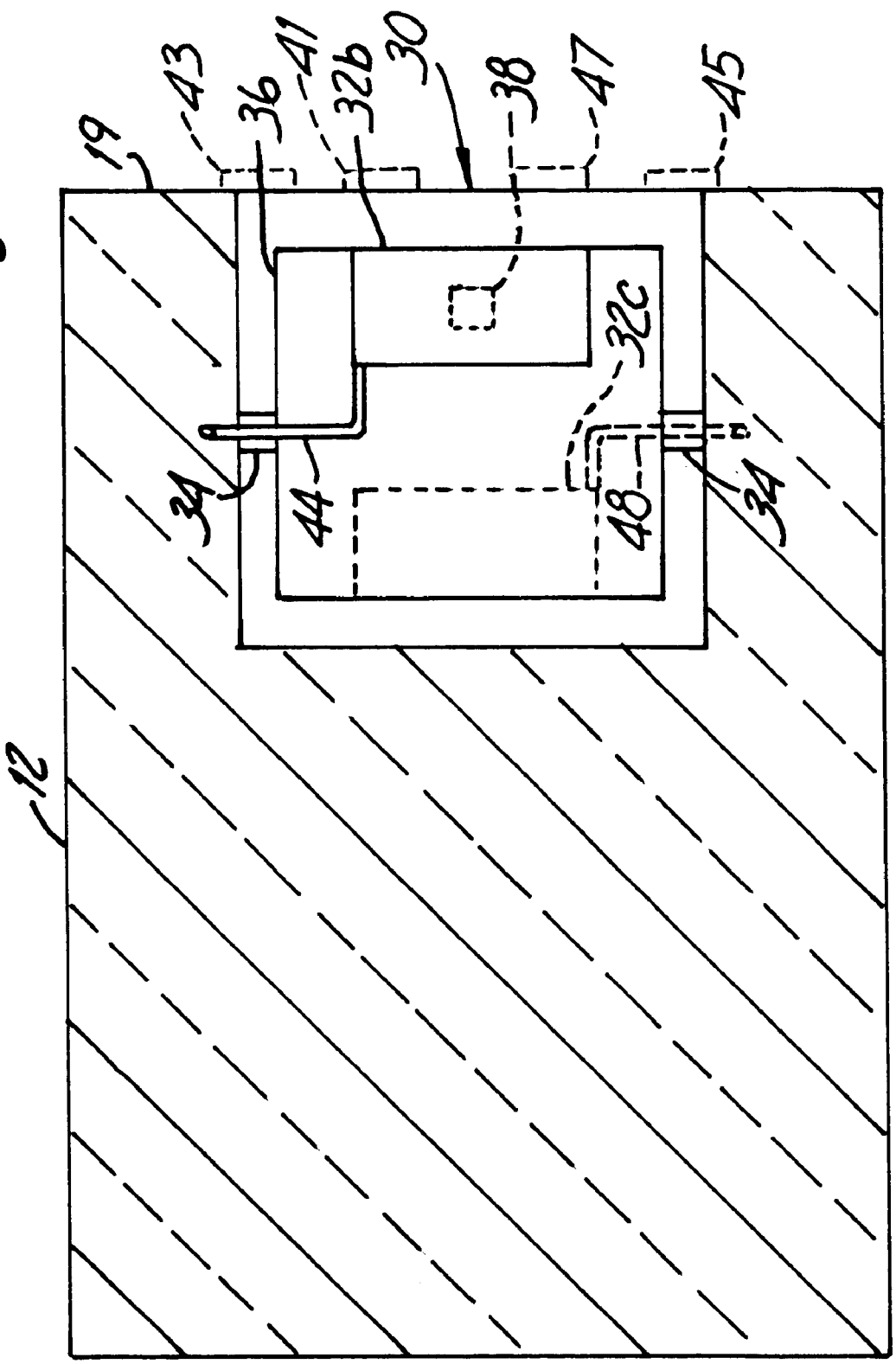

FORCE SENSING SLIDER

CROSS-REFERENCE TO RELATED APPLICATION

This application claims priority from Provisional Patent Application Ser. No. 60/059,442, filed Sep. 22, 1997 for "Force Sensing Slider" by J. Zhang, L. Zhang, P. Segar and M. Schaenzer.

BACKGROUND OF THE INVENTION

The present invention relates to a force sensing disc drive slider, and more particularly to a disc drive slider having a capacitance sensor responsive to forces acting on a contact pad that does not affect the aerodynamic characteristics of the slider.

In a disc drive system, the contact force between a slider carrying a transducing head and a disc media perpendicular to the surface of the disc media is a very important parameter. It is desirable to accurately measure this force in order to obtain a quantitative understanding of a variety of head-to-disc interface phenomena such as friction, vibration and wear, for example, particularly in planar slider systems where the transducing head is somewhat exposed at the air-bearing surface. These measurements enable slider glidability, seek and take-off characteristics to be analyzed for potential improvements in the slider architecture. The debris generation and wear characteristics of the head-to-disc interface could also be measured through mapping of the contact force measurements. The uniformity of the surface of the disc media could be tested and certified by analyzing these measurements. Other applications utilizing quantitative measurements of the contact force between the slider and disc media perpendicular to the disc surface will be apparent to one skilled in the art.

In order for the contact force measurements to be useful, the slider incorporating the contact force sensor must exhibit the same aerodynamic behavior as an actual slider for carrying a transducing head. Therefore, the contact force sensor must be implemented within the physical dimensions of an actual slider. The fabrication of the contact force sensor should not affect the fabrication process used in forming the air-bearing surface (ABS) of the slider. The resulting slider containing the contact force sensor must be attachable to a suspension in the same manner as a head-carrying slider, and the wire leads of the force-sensing slider should be located in a manner similar to the head-carrying slider.

Attempts have been made to estimate the contact force between the slider and disc media indirectly using acoustic emission signals. However, the physical phenomena occurring in this acoustic emission process are extremely complicated, such that some sort of direct measurement is necessary as a reference or calibration point for this method to yield results with any level of accuracy.

Another approach to measuring the contact force at the head-to-disc interface has been to incorporate a piezoelectric element onto a test slider, with the voltage across the piezoelectric element representing a strain force applied to the piezoelectric element due to forces acting on the test slider. While this approach is able to detect forces acting on the slider, such as forces due to the slider contacting debris or an asperity on the disc surface, it is difficult to isolate the z-component of the force (perpendicular or normal to the nominal disc surface) from the overall signal. The signal interpretation process to determine this perpendicular force component is extremely complex, and involves significant material research.

Therefore, there is a need in the art for a readily implemented contact force sensor for use with a standard slider, with minimal signal interpretation involved in analyzing the contact force at the head-to-disc interface perpendicular to the surface of the disc media.

BRIEF SUMMARY OF THE INVENTION

The present invention is a disc drive test slider apparatus for measuring contact force perpendicular to a surface of a rotating disc media. A slider body is positioned proximate the surface of the rotating disc. An air-bearing surface of the slider body is substantially parallel to the nominal surface of the disc and is separated from the surface of the disc by a glide height. The slider body includes a cavity having a side wall substantially normal to the surface of the disc and a wall substantially parallel to the surface of the disc. A beam flexure is attached to the side wall of the cavity. A plate is attached to the beam flexure in the cavity, and the beam flexure has a spring resiliency to permit movement of the plate in the cavity substantially normal to the surface of the disc. A contact rod is attached to the plate, and extends through the cavity and a via in the slider body. The contact rod has a distal tip projecting from the air-bearing surface. A force applied to the contact rod perpendicular to the surface of the rotating disc media causes displacement of the plate normal to the surface of the disc.

In one embodiment, metal films are formed on the plate and on the wall of the cavity substantially parallel to the surface of the disc. The metal films confront one another, and a change in capacitance between the metal films due to changes in a gap distance between the metal films caused by displacement of the plate normal to the surface of the disc is determined.

Another aspect of the present invention is a process of forming a disc drive test slider for measuring contact force perpendicular to a surface of a rotating disc media. A slider body is provided, and a cavity is formed in the slider body through the air-bearing surface between the leading edge surface and the trailing edge surface of the slider body. The cavity has a first wall substantially parallel to the air-bearing surface and a second wall substantially normal to the air-bearing surface. A first metal film is deposited on the first wall of the cavity. A sacrificial layer is formed over the first metal film. A second metal film is deposited on the first sacrificial layer. A first slider body material layer is deposited over the first sacrificial layer and the second metal film to fill the cavity, with the first slider body material layer projecting beyond the level of the air-bearing surface. The first slider body material layer is etched to form a beam flexure attached to the second wall of the cavity, a plate attached to the beam flexure, and a contact rod projecting from the plate beyond the level of the air-bearing surface. A second sacrificial layer is deposited on the beam flexure, plate and first sacrificial layer. A second slider body material layer is deposited on the second sacrificial layer to the level of the air-bearing surface, leaving a gap around the contact rod. The features of the air bearing surface of the slider body are defined. The first and second sacrificial layers are then removed, so that the plate is movable normal to the air-bearing surface in response to a force applied to the contact rod normal to the air-bearing surface of the slider body.

A further aspect of the invention is a method of measuring contact force between a disc drive test slider and a rotating disc media. A mechanical assembly is provided in the slider that is displaceable in response to the contact force, the assembly providing a mechanical force to oppose the contact force. The mechanical force increases with displacement of the assembly. The disc drive test slider is operated so that contact force is applied to the mechanical assembly, and the displacement of the mechanical assembly is measured.

BRIEF DESCRIPTION OF THE DRAWINGS

FIG. 2 is a diagrammatic section view of a disc drive slider including contact force measuring apparatus according to a first embodiment of the present invention, taken at plane 2—2 in FIG. 1.

FIG. 3 is a diagrammatic section view of the disc drive slider including contact force measuring apparatus, taken along line 3—3 in FIG. 2.

FIG. 4 is a diagrammatic section view as in FIG. 2 of a disc drive slider containing contact force measuring apparatus according to a second embodiment of the present invention.

FIG. 5 is a diagrammatic section view of the disc drive slider including contact force measuring apparatus taken along line 5—5 in FIG. 4.

DETAILED DESCRIPTION OF THE PREFERRED EMBODIMENTS

Figure 1:
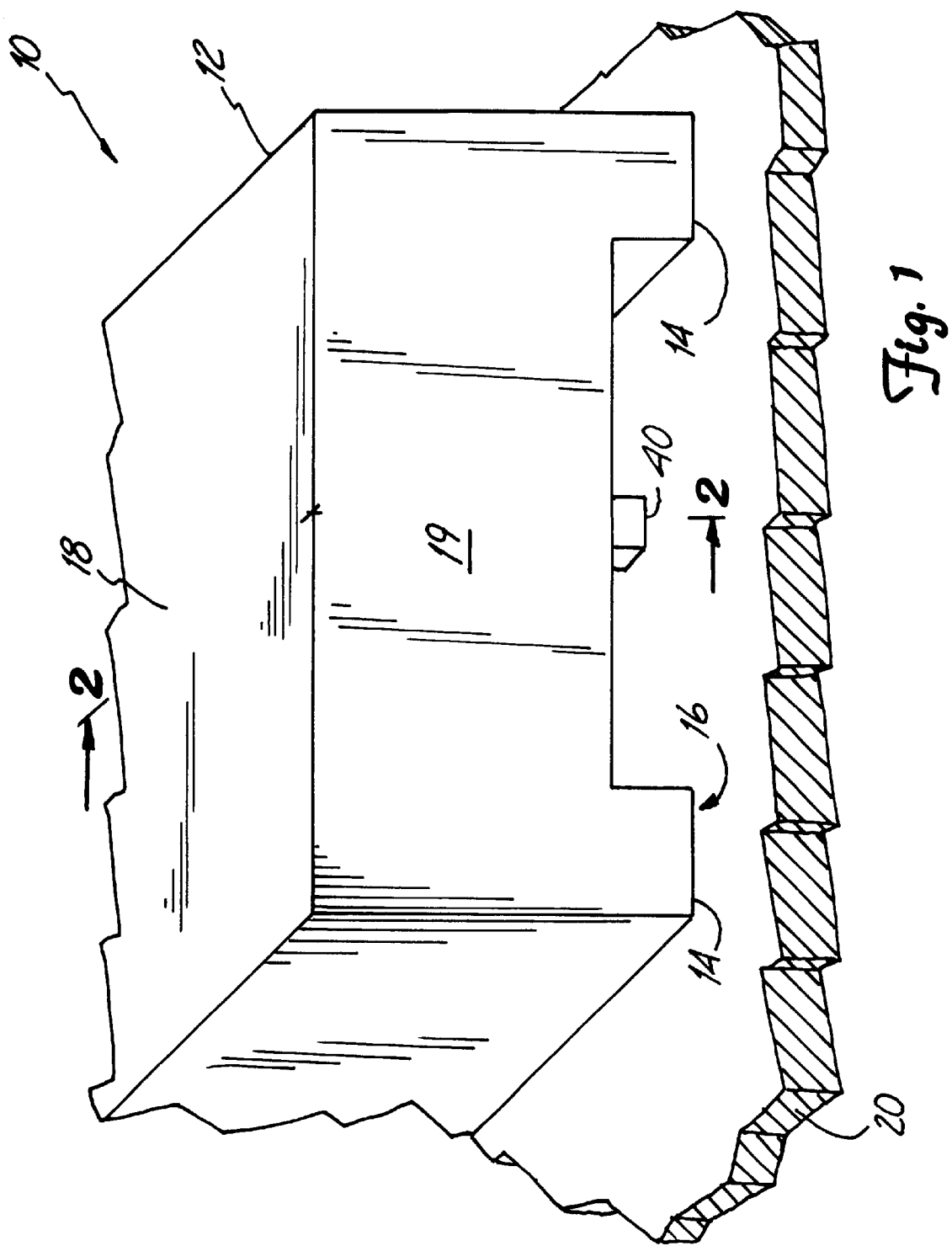
FIG. 1 is a perspective view of a disc drive slider showing the rear of the slider as it flies over a rotating disc.

FIG. 1 is a perspective view of head gimbal assembly (HGA) 10 including disc drive slider 12 showing trailing edge surface 19 of slider 12 as slider 12 is positioned above disc 20, which is a magnetic storage medium. Slider 12 includes rails 14 on air-bearing surface (ABS) 16, top surface 18 and trailing edge surface 19. Slider 12 is supported by a head gimbal assembly suspension (not shown). Air-bearing surface 16 is aerodynamically designed to include rails 14 so that windage encountered due to rotation of disc 20 causes slider 12 to "fly" a small distance (the glide height) above the surface of disc 20. In the case of a read/write slider, a transducing head (not shown) is carried by slider 12 at trailing edge surface 19, usually on a rail 14, for reading data from disc 20 and writing data to disc 20.

FIG. 2 is a diagrammatic section view taken at plane 2—2 in FIG. 1, and FIG. 3 is a diagrammatic section view taken along line 3—3 in FIG. 2, showing disc drive slider 12 including contact force measuring apparatus according to a first embodiment of the present invention. Cavity 30 is formed in slider 12 at the trailing edge surface 19 between top surface 18 and ABS 16. Preferably, cavity 30 is centrally located between rails 14 and between surface 31 of the pressure cavity between the rails and top surface 18. A plate 36 is attached to a side wall of cavity 34 by beam flexure 34, which enables plate 36 to move with respect to the top and bottom walls of cavity 30 via bending of beam flexure 34. In the embodiment shown in FIGS. 2 and 3, plate 36 is attached via beam flexure 34 to the leading side wall of cavity 30, but in other embodiments it may be attached to one of the other side walls of the cavity. Metal film 32a is deposited on the top wall of cavity 30 and metal film 32b is deposited on plate 36 to confront metal film 32a. Vertical displacement of plate 36 normal to the surface of disc 20 therefore changes the distance between metal films 32a and 32b. Contact rod 38 is attached to the underside of plate 36, and extends in sliding engagement through via 39 in slider 12 to distal tip 40 beyond ABS 16. Lead wires 42 and 44 electrically connect metal films 32a and 32b, respectively, to bond pads 41 and 43 on trailing edge surface 19 of slider 12, which are in turn connected to analyzing/driving circuitry 46 in a manner known in the art.

In operation, a voltage is applied between metal films 32a and 32b, creating a parallel plate capacitor between the metal films. When a force is applied to contact rod 38 due to physical contact with debris or an irregularity on the surface of the disc or some other tribological or environmental effect, contact rod 38 moves within via 39 to move plate 36. Hence, the balancing position of plate 36 will shift. Specifically, the displacement of plate 36 depends on the magnitude of the force applied to contact rod 38, the opposing force resisting movement of plate 36 due to the spring resiliency (characterized by the spring constant) of beam flexure 34, and the electromechanical force of attraction between metal films 32a and 32b due to the opposite charges on the films. Preferably, the sensor is designed so that the electrical force of attraction between metal films 32a and 32b is negligible in comparison to the contact force acting on contact rod 38 and the resistance force provided by beam flexure 34. At some position, the sum of the forces acting on plate 36 is zero, so that plate 36 stops moving toward the top wall of cavity 30—it is this position that is of interest to determine the magnitude of the contact force applied to contact rod 38.

The voltage applied between metal films 32a and 32b is kept constant, so that a transient current is generated due to the capacitance change caused by the change in the gap distance between metal films 32a and 32b. The transient current may be measured directly, or may be transformed into a voltage signal, the signal being directly related to the capacitance change which is in turn directly related to the displacement of plate 36 caused by a force on contact rod 38. The contact force may be calculated based on the displacement of plate 36, the known spring constant of beam flexure 34, and the known voltage applied to metal films 32a and 32b.

The spring constant of beam flexure 34 required to provide the proper amount of resistance to vertical movement of plate 36 is determined based on the order of forces desired to be measured and the desired physical displacement of plate 36, according to the following equation:

$$k = \frac{F}{x} = \frac{mg}{x}$$

where k=spring constant, F=force, x=displacement, m=mass, and g=acceleration due to gravity. Where the force to be measured is about 0.01 N and the desired displacement is about 0.1 µm, a spring constant of about 1000 Newtons/meter is required.

The area of metal films 32a and 32b and the gap distance between metal films 32a and 32b are limited by the thickness and dimensions of slider 12 and cavity 30. In a preferred embodiment, metal films 32a and 32b are each 0.5 mm×0.5 mm, and the at-rest gap distance between metal films 32a and 32b is 1.0 µm. For these exemplary parameters and a voltage of about 10 volts applied across metal films 32a and 32b, a sensing current of about 0.2 mA is obtained for a displacement of 0.1 µm, which is a sufficiently large current to be measured and analyzed using routine electronic analyzing circuitry 46, as is known in the art. From the sensing current measurement, the displacement of plate 36 and therefore the forces acting to cause the displacement of plate 36 may be readily determined.

It should be understood that the parameters described above are exemplary, and it will be apparent to one skilled in the art that a variety of spring constants, plate dimensions, voltages, and other parameters may be used to achieve the results of the present invention, that is, to measure the force applied to contact rod 38 based on the vertical displacement of plate 36. In addition, while the use of a capacitive sensor in the contact force measuring apparatus is preferred for its simplicity, a variety of techniques for determining changes in vertical displacement of plate 36, or even for directly determining the force applied to contact rod 38, may be used to realize the utility of the present invention. For example, optical or piezoelectric technology may be utilized for this purpose, to name a few samples. In addition, modifications may be made to the specific configuration of lead wires 42 and 44 and bond pads 41 and 43, as is known in the art.

FIG. 4 is a diagrammatic section view as in FIG. 2, and FIG. 5 is a diagrammatic section view taken alone line 5—5 in FIG. 4, showing disc drive slider 12 including contact force measuring apparatus according to a second embodiment of the present invention. Cavity 30 is formed in slider 12 in the same manner described above with respect to FIGS. 2 and 3. Plate 36 is attached to the sides of cavity 34 at its center by beam flexures 34, enabling the ends of plate 36 to move with respect to the top and bottom walls of cavity 30 via bending of beam flexures 34. Metal films 32a and 32b are deposited opposite one another on the top wall of cavity 30 and on the top surface of plate 36, respectively, at a first end of plate 36. Metal films 32c and 32d are deposited opposite one another on the bottom of plate 36 and on the bottom wall of cavity 30, respectively, at a second end of plate 36. Vertical displacement of plate 36 at the first end and opposite vertical displacement of plate 36 at the second end therefore changes the distance between metal films 32a and 32b and between metal films 32c and 32d. Contact rod 38 is attached to the underside of plate 36 at the first end of plate 36, and extends in sliding engagement through via 39 in slider 12 to distal tip 40 beyond ABS 16. Lead wires 42, 44, 48 and 49 electrically connect metal films 32a, 32b, 32c and 32d, respectively, to bond pads 41, 43, 45 and 47 on trailing edge surface 19 of slider 12, which are in turn connected to analyzing/driving circuitry 46 in a manner known in the art.

The operation of the plate capacitors shown in FIGS. 4 and 5 is similar to the operation described above with respect to FIGS. 2 and 3, in that the capacitance between metal films 32a and 32b is related to the displacement of the end of plate 36. However, the dual film-pair arrangement presents some additional configuration options. In a first arrangement, beam flexure 34 is extremely flexible, so that the force associated with the spring's resistance to vertical rotation is negligible. In this arrangement, beam flexure 34 acts only as a pivot at the center of plate 36. Both metal film 32c and metal film 32d are connected to battery terminals having the same polarity, so that equal charge of the same polarity (and relatively large magnitude) is present on each metal film and the resulting electrical repulsion force between metal films 32c and 32d therefore provides the proper amount of resistance to rotational movement of plate 36 around the pivot for the desired range of forces applied to contact rod 38 to be measured. In a second arrangement, beam flexure 34 is relatively stiff, providing significant resistance to rotational movement of plate 36, and the same voltages are applied across metal films 32a and 32b and metal films 32c and 32d. In this case, the electromechanical force resisting rotational movement of plate 36 combines with the resistance provided by beam flexure 34 to yield the proper amount of total resistance, and the change in capacitance between metal films 32a and 32b is the same as the change in capacitance between metal films 32c and 32d, effectively doubling the magnitude of the signal. Preferably, this arrangement of the sensor is designed so that the electrical force of attraction between metal films 32a and 32b and between metal films 32c and 32d is negligible in comparison to the contact force acting on contact rod 38 and the resistance force provided by beam flexures 34. In either arrangement, a sense current signal is again obtained by analyzing circuitry 46 which can be readily translated into a contact force measurement. Either of the embodiments shown in FIGS. 2 and 3 or in FIGS. 4 and 5 are acceptable for determining the contact force acting on slider 12.

In both the embodiment shown in FIGS. 2 and 3 and the embodiment shown in FIGS. 4 and 5, there are two positions of plate 36 of interest. The first is the at-rest position, where no contact force is acting on contact rod 38, and the second is the maximum displacement position, where the contact force acting on contact rod 38 has moved plate 36 to its furthest displacement for that particular occurrence of contact force (that is, plate 36 has moved up and is about to move back toward the at-rest position).

In the at-rest position, there are essentially three forces acting on plate 36. The first is the force of gravity, pulling the end of plate 36 down. The second is the electrical force between metal films 32a and 32b (and between metal films 32c and 32d where they are arranged as a second capacitive sensor), attracting one another due to the opposite charges on the films and pulling that end of plate 36 up. The third is the balancing force. The balancing force is provided in the embodiment shown in FIGS. 2 and 3 and in the second arrangement of the embodiment shown in FIGS. 4 and 5 by the stiffness of beam flexure 34. In the first arrangement of the embodiment shown in FIGS. 4 and 5, the balancing force is provided by the electrical force of repulsion between metal films 32c and 32d. In the at-rest position, the sum of the forces acting on plate 36 is zero, so that the end of plate 36 is suspended in a fixed position.

In the maximum displacement position, there are essentially four forces acting on plate 36. The first is gravity, the second is the electrical force, and the third is the balancing force, as described above. The fourth is the contact force acting on contact rod 38 to move plate 36 upward. The force of gravity is the same in the maximum displacement condition as the at-rest position. The electrical force between metal films 32a and 32b (and between metal films 32c and 32d when they are arranged as a second capacitive sensor) is greater than the at-rest position, since the charge on the films increases (due to the increase in capacitance when the gap distance between films decreases) and the distance between the films decreases, with the electrical force being given by the following:

$$F = \frac{1}{4\pi\varepsilon_0}\frac{Q_1 Q_2}{d^2}$$

where $\varepsilon_0$ is the permittivity of free space, $Q_1$ is the charge on one metal film, $Q_2$ is the charge on the other metal film, and d is the gap distance between the metal films. Therefore, since the forces acting to push the end of plate 36 up are greater than the at-rest forces and the force acting to pull the end of plate 36 down is the same as the at-rest force, there must be an increased balancing force resisting the upward movement of the end of plate 36 at the maximum displacement position.

In the embodiment shown in FIGS. 2 and 3 and in the second arrangement of the embodiment shown in FIGS. 4 and 5, the increased balancing force resisting movement of the end of plate 36 in the upward direction is provided due to the spring resiliency of beam flexure 34. As beam flexure 34 is bent further from its at-rest position, the force provided by beam flexure 34 resisting further bending increases. At the maximum displacement position, this force (in combination with the force of gravity) offsets the electrical attraction force and the contact force, so that upward movement of the end of plate 36 ceases. This force is known because the spring constant of beam flexure 34 and the displacement of the end of plate 36 are known, and the magnitude of the contact force can therefore be quantified based on the distance of displacement between metal films 32a and 32b.

In the first arrangement of the embodiment shown in FIGS. 4 and 5, the increased balancing force resisting movement of the end of plate 36 in the upward direction is provided due to the decrease in distance between metal films 32c and 32d, since the repulsion force between the films is given by the force equation above (with force being inversely proportional to the square of the gap distance). This balancing force is known because the distance between metal films 32c and 32d is known from the sense current/capacitance/displacement relationship associated with metal films 32a and 32b, the distance between metal films 32c and 32d being equal to the distance between metal films 32a and 32b. The magnitude of the contact force can therefore be quantified based on the distance of displacement between metal films 32a and 32b.

Figure 6A:
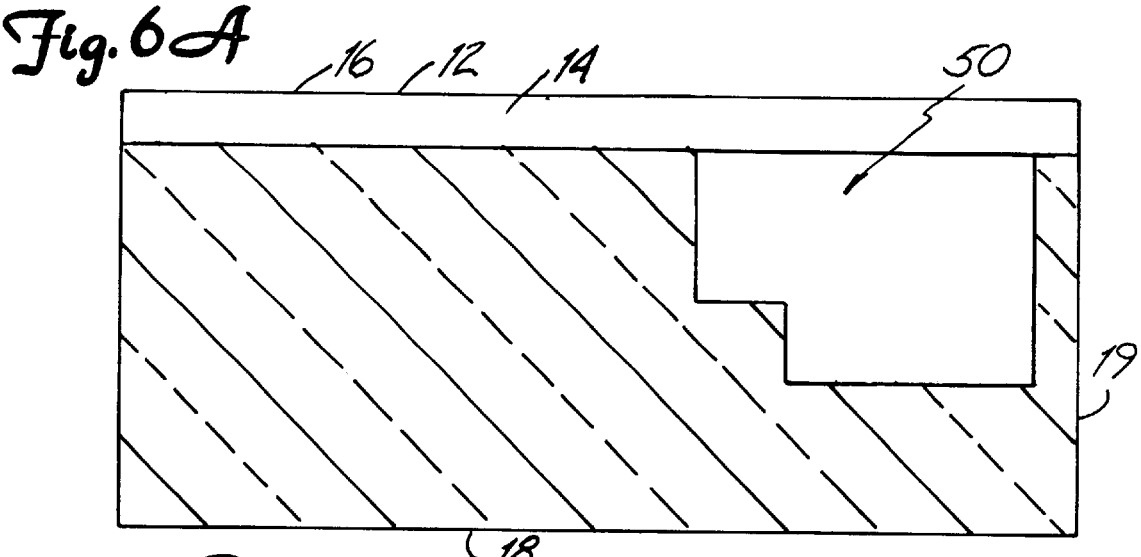
FIGS. 6A–6H are section diagrams illustrating the fabrication process steps involved in forming a disc drive slider having contact force measuring apparatus.
Figure 6B:
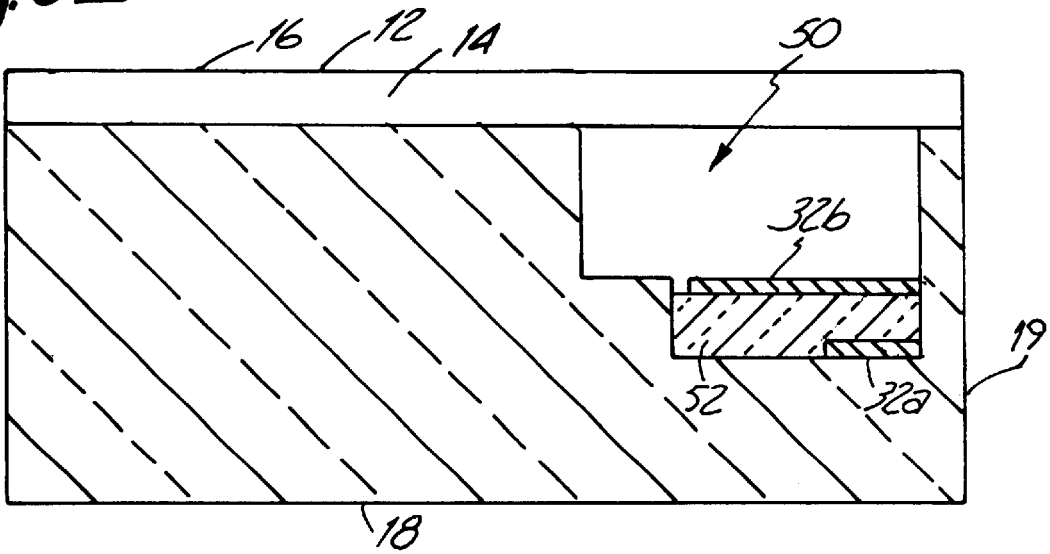

FIGS. 6A–6H are section diagrams illustrating fabrication process steps involved in forming disc drive slider 12 having contact force measuring apparatus according to the present invention. The process steps shown in FIGS. 6A–6H illustrate formation of the contact force measuring apparatus shown in FIGS. 2 and 3; similar process steps would be performed to form the contact force measuring apparatus shown in FIGS. 4 and 5. Initially, as shown in FIG. 6A, two etching steps are performed to create a cavity 50 in slider 12 through air-bearing surface 16, with a stepped shape at the bottom of cavity 50. Cavity 50 is preferably 1 mm×1 mm in area, with a depth of 10 $\mu$m. After cavity 50 has been formed, metal film 32a is deposited on the bottom surface of cavity 50, a sacrificial filler material 52 is formed over metal film 32a, and top metal film 32b is deposited on sacrificial material 52, as shown in FIG. 6B. Sacrificial material 52 is preferably about 2 mm thick and is preferably composed of a material that may be easily deposited and later removed without affecting neighboring metal and polysilicon components. Such a material choice is within the ability of one skilled in the art; silicon dioxide or an organic material such as photoresist may be used in an exemplary embodiment.

Figure 6C:
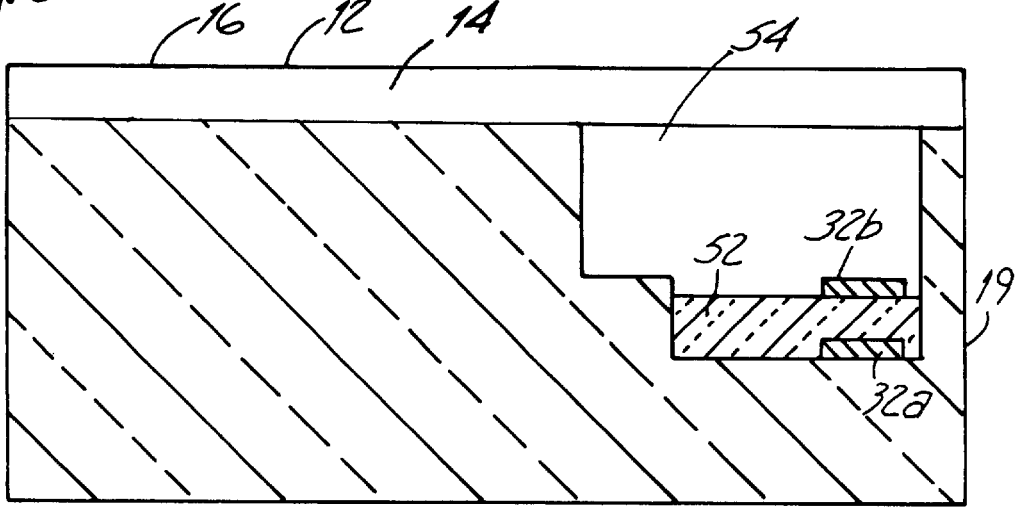
Figure 6D:
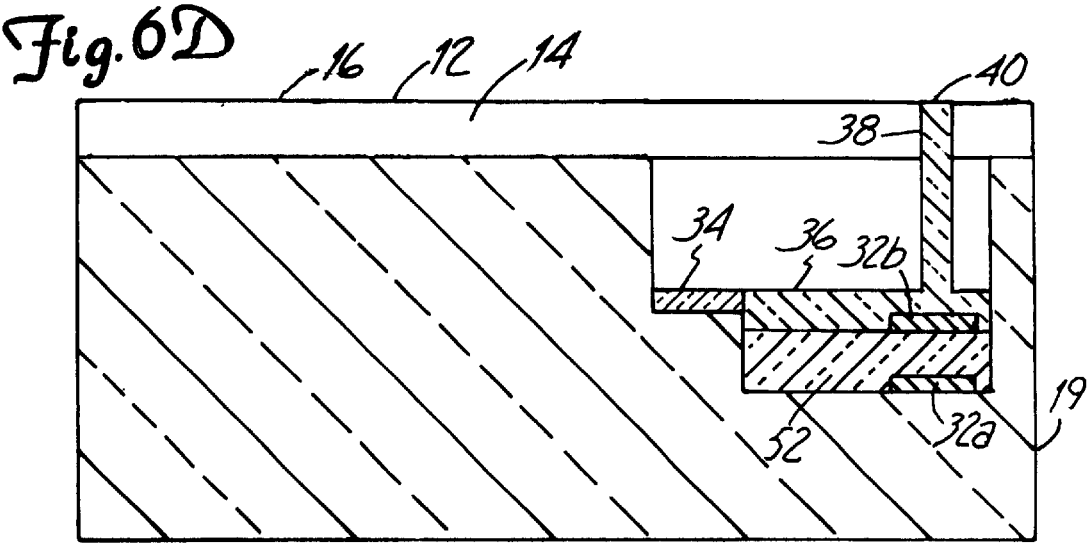
Figure 6E:
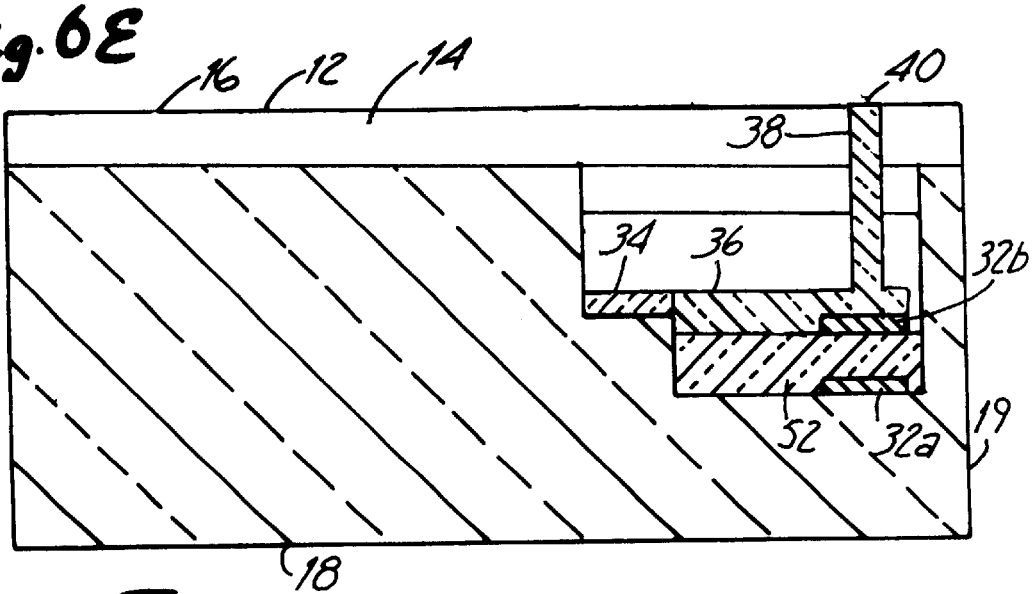

As shown in FIG. 6C, top metal film 32b is etched into the desired electrode shape, and polysilicon slider body material 54 is deposited over sacrificial material 52 and metal film 32b to fill the cavity in slider 12. Next, the polysilicon slider body material is etched to form contact rod 38, plate 36 and beam flexure 34, as shown in FIG. 6D. This etch defines the thickness of plate 36, which is preferably about 5 $\mu$m, and of beam flexure 34, which is chosen to yield the desired effective spring constant. At this point, plate 36 is attached to all four walls of the cavity in slider 12. Next, as shown in FIG. 6E, another etch is performed to define the shape of plate 36 and of beam flexure 34. This etch detaches plate 36 from three walls of the cavity and shapes beam flexure 34, yielding the configuration shown in FIG. 3. Plate 36 is preferably about 30 $\mu$m long and 100 $\mu$m wide.

Figure 6F:
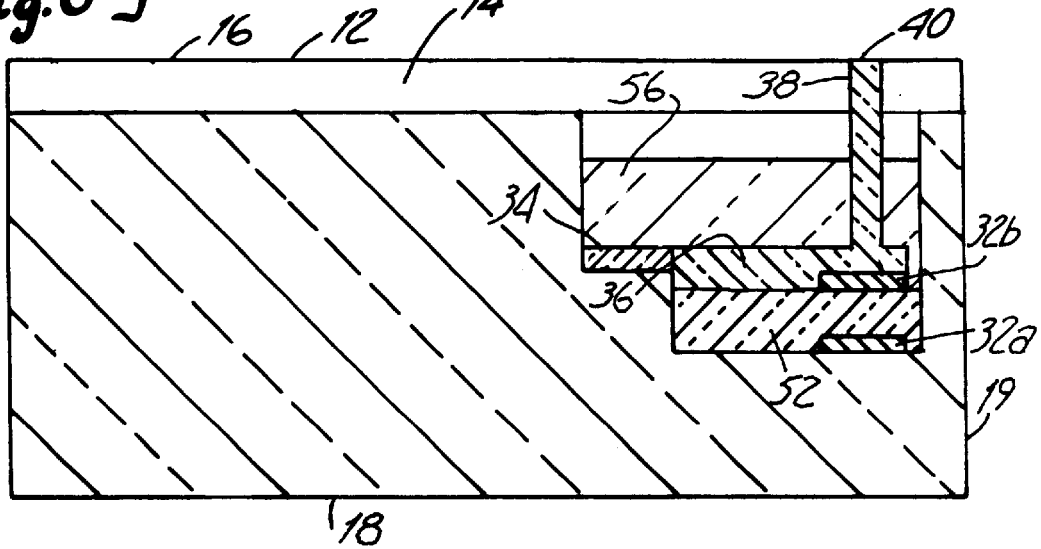
Figure 6G:
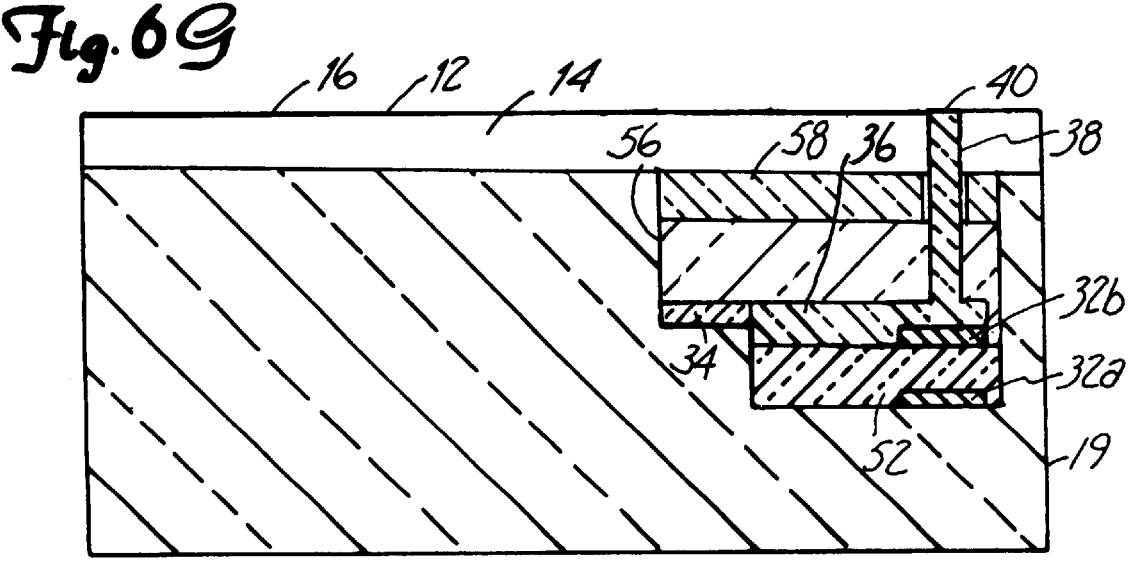
Figure 6H:
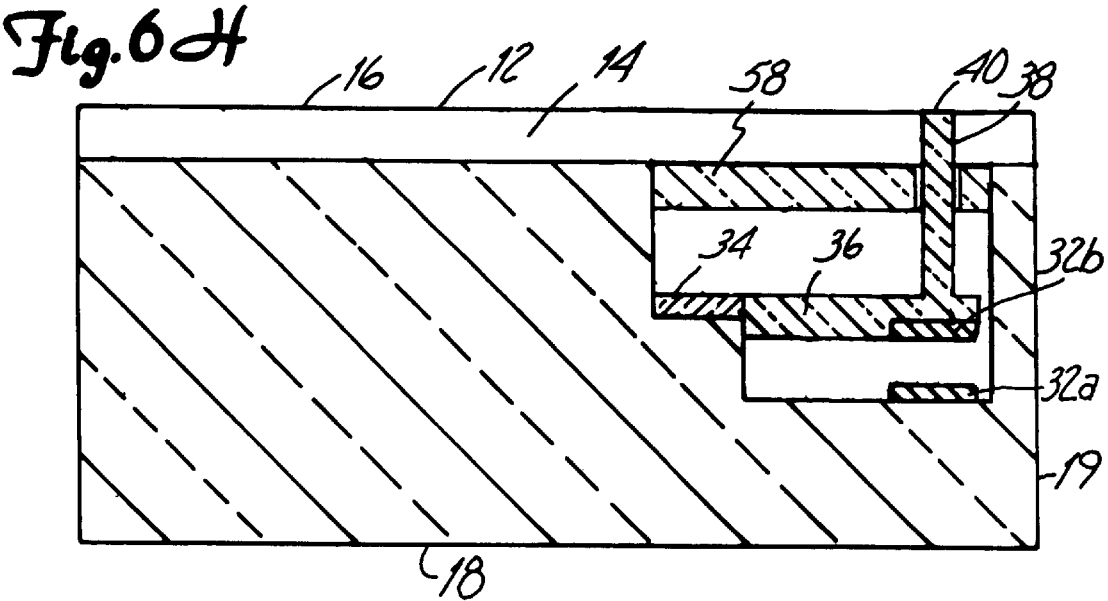

As shown in FIG. 6F, another layer of sacrificial material 56 is deposited over beam flexure 34, plate 36 and sacrificial material 52. Sacrificial material 56 is preferably about 2 mm thick, and is preferably composed of the same material as sacrificial material 52. Next, as shown in FIG. 6G, a top layer of polysilicon slider body material 58 is deposited on sacrificial material 56 up to air-bearing surface 16 of slider 12, leaving a small gap around contact rod 38. The top polysilicon slider material layer 58 is planarized along with the rest of air-bearing surface 16 of slider 12 using a chemical mechanical polishing process. Ion milling is then performed to define the features of air-bearing surface 16, as is known in the art. Finally, as shown in FIG. 6H, sacrificial materials 56 and 52 are removed, leaving plate 36 free to move vertically, suspended by beam flexure 34, in response to contact force applied to contact rod 38.

The present invention therefore provides a contact force measuring sensor for use with a standard slider, by forming a cavity in the slider and implementing the sensor in the cavity. The contact force measuring sensor responds directly to the vertical component of the forces acting on the slider, so that minimal signal interpretation is required to obtain a contact force measurement at the head-to-disc interface perpendicular to the surface of a disc media. The slider body and shaped features of the present invention have been described as fabricated from polysilicon, for ease of processing; it will be understood by one skilled in the art that the apparatus described above may be formed of regular read/write slider material such as titanium aluminum carbide if the capability to process the features described above in such a material is available.

Although the present invention has been described with reference to preferred embodiments, workers skilled in the art will recognize that changes may be made in form and detail without departing from the spirit and scope of the invention.

What is claimed is:

1. A disc drive test slider apparatus for measuring contact force with a surface of a rotating disc media, comprising:

a slider body for positioning proximate a nominal surface of the rotating disc, the slider body having an air-bearing surface substantially parallel to the nominal surface of the disc and separated from the nominal surface of the disc by a glide height;

a cavity in the slider body; and means in the cavity for measuring a contact force acting on the slider body.

2. A disc drive test slider apparatus for measuring contact force with a surface of a rotating disc media, comprising:

a slider body for positioning proximate the surface of the rotating disc, the slider body having an air-bearing surface substantially parallel to the surface of the disc and separated from the surface of the disc by a glide height, a leading edge surface and a trailing edge surface, and a cavity including at least one side wall substantially normal to the surface of the disc and at least one wall substantially parallel to the surface of the disc;

at least one beam flexure attached to the side wall of the cavity;

a plate attached to the at least one beam flexure in the cavity, the beam flexure having a resiliency to permit movement of the plate in the cavity substantially normal to the surface of the disc; and a contact rod attached to the plate, the contact rod extending through the cavity and a via in the slider body and having a distal tip projecting from the air-bearing surface, wherein a force applied to the contact rod perpendicular to the surface of the rotating disc media causes displacement of the plate normal to the surface of the disc.

3. The disc drive test slider apparatus of claim 2, including means for providing mechanical resistance to the force applied to the contact rod displacing the plate.

4. The disc drive test slider apparatus of claim 3, wherein the means for providing mechanical resistance is stiffness in the resilient beam flexure.

5. The disc drive test slider apparatus of claim 3, wherein the means for providing mechanical resistance is an electrical repulsion force.

6. The disc drive test slider apparatus of claim 2, wherein the at least one side wall of the cavity to which the at least one beam flexure is attached is substantially parallel to the trailing edge surface of the slider body.

7. The disc drive test slider of claim 2, wherein the at least one beam flexure comprises a pair of beam flexures on opposite sides of the plate, permitting the plate to pivot on an axis between a first end of the plate nearest the leading edge surface of the slider body and a second end of the plate nearest the trailing edge surface of the slider body.

8. The disc drive test slider apparatus of claim 2, further comprising:

means for measuring the force applied to the contact rod based on the displacement of the plate normal to the surface of the disc.

9. The disc drive test slider apparatus of claim 2, further comprising:

a first metal film on the plate; and a second metal film on the wall of the cavity substantially parallel to the surface of the disc, confronting the first metal film.

10. The disc drive test slider apparatus of claim 9, further comprising:

means for determining a change in capacitance between the first and second metal films due to changes in a gap distance between the first and second metal films caused by displacement of the plate normal to the surface of the disc.

11. The disc drive test slider apparatus of claim 2, wherein the at least one wall of the cavity substantially parallel to the surface of the disc comprises a top wall and a bottom wall, and further comprising:

a first metal film on the plate;

a second metal film on the top wall of the cavity confronting the first metal film;

a third metal film on the plate; and a fourth metal film on the bottom wall of the cavity opposite the third metal film.

12. The disc drive test slider apparatus of claim 11, further comprising:

means for determining a change in capacitance between the first and second metal films and between the third and fourth metal films caused by displacement of the plate normal to the surface of the disc.

13. The disc drive test slider apparatus of claim 11, further comprising means for determining a change in capacitance between the first and second metal films, wherein a voltage is applied to the third and fourth metal films to create an electrical repulsion force for resisting the force applied to the contact rod displacing the plate.

14. A method of measuring contact force between a disc drive test slider and a rotating disc media, the method comprising:

providing a mechanical assembly in a cavity in the slider that is displaceable in response to the contact force, the assembly providing a mechanical force to oppose the contact force, the mechanical force increasing with displacement of the assembly;

operating the disc drive test slider so that contact force is applied to the mechanical assembly; and measuring the displacement of the assembly.

15. The method of claim 14, wherein the slider includes a cavity and the mechanical assembly includes a movable plate mounted in the cavity and a contact rod connected to the plate and extending from the cavity to an interface between the slider and the rotating disc media to receive the contact force, and wherein the step of measuring comprises measuring the displacement of the plate.

16. The method of claim 15, wherein the plate includes a first capacitor film confronting a second capacitor film in the cavity, and wherein the step of measuring includes measuring the capacitance between the first and second capacitor films.

17. The method of claim 15, wherein the plate is mounted in the cavity by a resilient beam flexure having an end rigidly mounted to a vertical wall of the cavity and the mechanical force opposing the contact force is provided by a stiffness of the resilient beam.

18. The method of claim 15, wherein the plate is pivotally mounted in the cavity and includes first conductive film confronting a second conductive film in the cavity, and wherein the mechanical force opposing the contact force is provided by applying a voltage to the first and second conductive films to develop an electrical force opposing the contact force.

* * * * *

UNITED STATES PATENT AND TRADEMARK OFFICE
CERTIFICATE OF CORRECTION

PATENT NO. : 6,269,687 B1  Page 1 of 1
DATED : August 7, 2001
INVENTOR(S) : Jing Zhang et al.

It is certified that error appears in the above-identified patent and that said Letters Patent is hereby corrected as shown below:

<u>Column 3,</u>
Line 54, delete "cavity 34", insert -- cavity 30 --

Signed and Sealed this

Ninth Day of July, 2002

*Attest:*

JAMES E. ROGAN
*Attesting Officer*  *Director of the United States Patent and Trademark Office*